May 3, 1932. J. G. COLLINS 1,856,465
MACHINE FOR RUNNING IN AND BURNING CRANK SHAFT BEARINGS
Filed Oct. 8, 1928
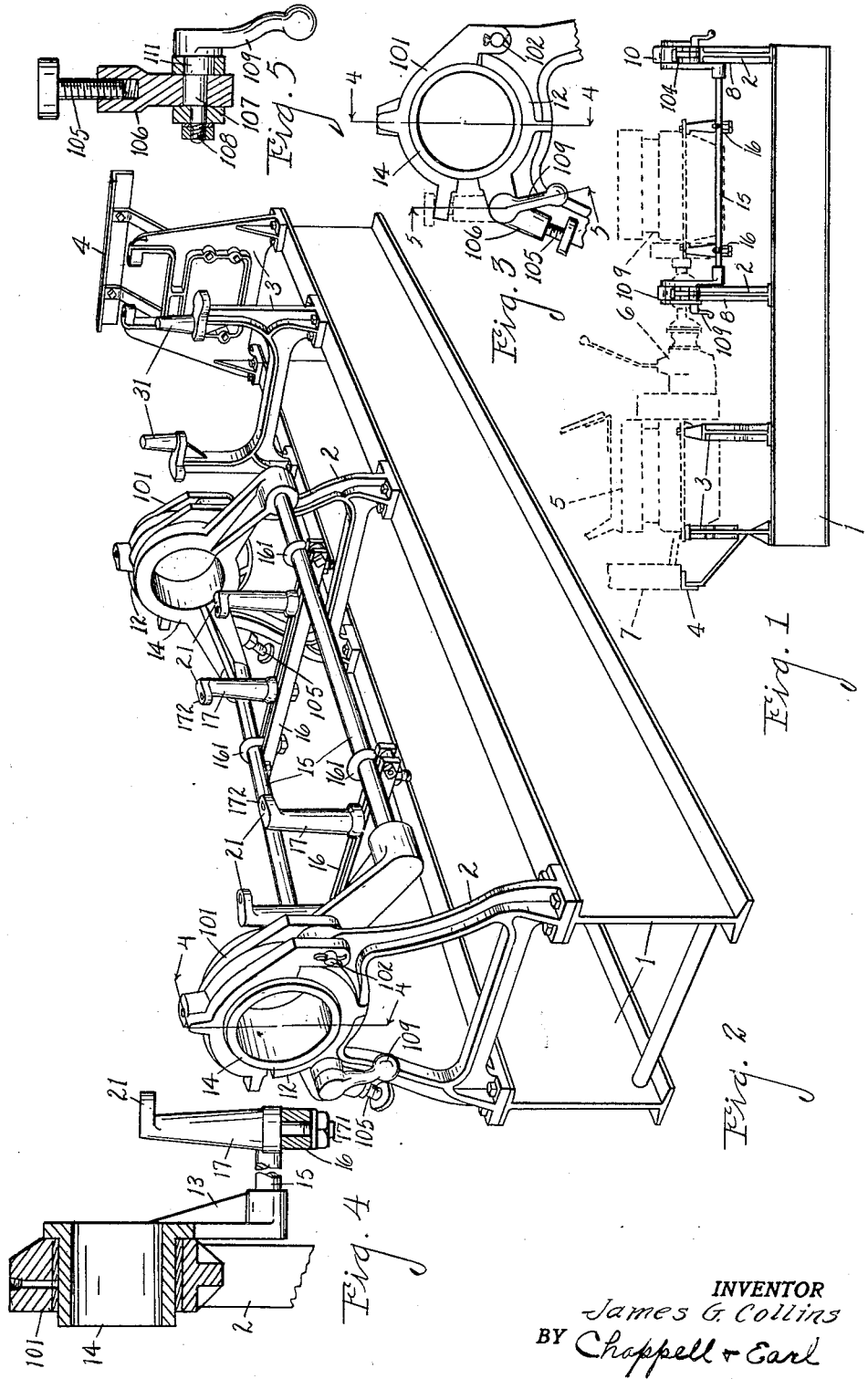
INVENTOR
James G. Collins
BY Chappell + Earl
ATTORNEYs Patented May 3, 1932

1,856,465

UNITED STATES PATENT OFFICE

JAMES G. COLLINS, OF KALAMAZOO, MICHIGAN, ASSIGNOR TO ATLAS PRESS COMPANY, OF KALAMAZOO, MICHIGAN

MACHINE FOR RUNNING IN AND BURNING CRANK SHAFT BEARINGS

Application filed October 8, 1928. Serial No. 310,970.

The main objects of this invention are:

First, to provide an improved burnishing and running-in machine that effectively utilizes an automobile engine as a power unit.

Second, to provide an improved attaching means for the power unit.

Third, to provide an improved connecting means for the frame and body of the engine to be run in and burnished.

Fourth, to provide adjustable clamp means for the engine block.

Fifth, to provide an improved adjusting clamp means for the trunnions thereof.

Objects pertaining to details and economies of construction and operation will definitely appear from the description to follow.

A device embodying my invention is clearly illustrated in the drawings, in which:

Fig. 1 is a side elevation of my improved burning and running-in machine, the power unit and the work being shown by dotted lines.

Fig. 2 is an enlarged perspective view of the burning and running-in machine, the power unit and work being omitted.

Fig. 3 is a fragmentary view of the eccentric clamp means for the hollow trunnions of the work cradle for the engine.

Fig. 4 is a sectional view on line 4—4 of Figs. 2 and 3 including a fragmentary portion of the left hand trunnion and fragment of the cradle and securing means shown by full lines.

Fig. 5 is an enlarged detail sectional elevation on line 5—5 of Fig. 3 showing details of the eccentric adjustable locking means, the eccentric and lever being in full lines.

The parts will be identified by their numerals of reference which are the same in all the views.

1 is the base of the machine made up of side beams tied together by suitable cross bars. 2 and 3 are power unit supporting brackets made of a suitable form to receive an automobile engine complete. 4 is a support for the radiator of the automobile engine power unit. Each has post brackets 21 and 31 to which the power unit is attached by bolts or screws.

5 is the automobile engine power unit, in dotted lines in Fig. 1. 6 is the transmission therefor. 7 is the radiator. 8 are the frame end standards, which are identical, for the engine to be run-in. 9 is the engine to be run-in, see dotted lines in Fig. 1. 10 are the trunnion bearings at the top of each frame end which are identical. Each bearing 10 is provided with hinged clamp cap member 101 hinged at 102. The outer ends are notched at 104 to receive the clamp screws 105.

A link 106 on eccentric 107 is formed integrally with its rockshaft 108 operated by lever 109 and clamps the cap member. Link 106 is provided with hand clamp screw 105 to engage the notch 104. Part 108 is smaller than the eccentric and part 111 is larger.

The bearings for the trunnions are preferably babbitted and made very accurate. The clamps, while they permit the complete tilting of the motor for work, hold the same very securely and accurately in place, while the shaft is being run-in.

The engine 9, see dotted lines Fig. 1, is supported in an adjustable cradle structure. The cradle comprises identical trunnioned ends 12 with projecting arms 13 and hollow central trunnions 14, which fit the trunnion bearings 10 and are adjustable therein. 15 are the round bar side rails connecting the ends 12. 16 are double cross support bars adjustable along the side rails 15 by means of clip clamps 161 at each end of each double bar. The double bars 16 are square and spaced to form ways for securing the adjustable engine supports. 17 are the adjustable engine support post brackets. 171 is the clamp screw in the bottom of each to secure it adjustably to the said ways of the double bars 16. 172 is the offset perforated lug at the top of the post bracket 17 for attachment by bolting to the flanges of the engine to be run-in. The cross bars 16 are adjustable lengthwise of the frame, the brackets 17 are adjustable lengthwise of the bars 16, and the off-set lugs at the top of brackets 17 are adapted to turn in any direction desired. Thus a complete adjustable support for the engine block is provided.

In operation the engine 5, to be used as a power plant, is adjusted on the supports 2 and 3 on the brackets 21 and 31 and carefully alined with the trunnions of the engine block supporting cradle. The engine block 9 is then placed upon the post support bracket 17, the bolts through the flanges removed, the structure carefully adjusted, and the block secured by bolts through the offset perforated lugs 172 which can be turned to desired position for the purpose. The precise location of these bolts is thus secured in the manner indicated. The adjustment of the engine is facilitated by the fact that the cradle can be tilted and clamped in position at any point. A double universal joint connects the power unit to the shaft being run-in and precise alinement thereof with the power plant is not needed.

After the crank shaft has been run-in the engine is effectively supported and adjustable to any position for further work which, of course, is in order when overhauling an engine that has been worn to the extent that it needs to have the crank shaft run-in.

The adjusting clamp shown on the trunnion is of special advantage in clamping trunnions of any construction in this kind of machine and is very secure and completely adjustable for wear.

I have shown my improved running-in machine in its preferred form which I desire to claim specifically. I also desire to claim the invention broadly and to claim also the particular adjusting clamp means, all as pointed out in the appended claims.

Having thus described my invention, what I claim as new and desire to secure by Letters Patent, is:

1. In a running in machine, the combination of a suitable base, frame brackets thereon adapted to receive and support an automobile engine in axial alinement as the power plant, frame brackets for supporting the engine block to be worked upon, trunnion bearings at the upper ends of such frame brackets with clamp caps therefor, an engine cradle comprising ends with suitable hollow trunnions supported in said trunnion bearings, side bars between said ends and beneath the said trunnions, double supporting cross bars forming slots with clamps to secure the same adjustably to the said side bars, upright post brackets adjustably secured to the said slot cross bars by screw clamps in the bottom thereof and having laterally projecting perforated lugs for attachment to an engine block, as specified.

2. In a running in machine, the combination of a suitable base, a power unit, frame brackets for supporting the engine block to be worked upon, trunnion bearings at the upper ends of such frame brackets, an engine cradle comprising ends with suitable hollow trunnions supported in said trunnion bearings, side bars between said ends and beneath the said trunnions, double supporting cross bars forming slots with clamps to secure the same adjustably to the said side bars, and upright post brackets adjustably secured to the said slot cross bars by screw clamps in the bottom thereof and having laterally projecting perforated lugs for attachment to an engine block, as specified.

In witness whereof I have hereunto set my hand.

JAMES G. COLLINS.